(12) United States Patent
Katzourakis et al.

(10) Patent No.: US 10,787,192 B1
(45) Date of Patent: Sep. 29, 2020

(54) STEER-BY-WIRE SYSTEM WITH MULTIPLE STEERING ACTUATORS

(71) Applicants: Diomidis Katzourakis, Chania (GR); Huibert Mees, Pleasanton, CA (US); Paul W. Choin, Sunnyvale, CA (US)

(72) Inventors: Diomidis Katzourakis, Chania (GR); Huibert Mees, Pleasanton, CA (US); Paul W. Choin, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 207 days.

(21) Appl. No.: 15/935,257

(22) Filed: Mar. 26, 2018

Related U.S. Application Data

(60) Provisional application No. 62/484,152, filed on Apr. 11, 2017.

(51) Int. Cl.
*B62D 5/00* (2006.01)
*B62D 5/04* (2006.01)
*B62D 6/02* (2006.01)
*B62D 6/08* (2006.01)

(52) U.S. Cl.
CPC ............. *B62D 5/003* (2013.01); *B62D 5/046* (2013.01); *B62D 5/0487* (2013.01); *B62D 6/02* (2013.01); *B62D 6/08* (2013.01)

(58) Field of Classification Search
CPC ...... B62D 5/003; B62D 5/046; B62D 5/0487; B62D 6/02; B62D 6/08
See application file for complete search history.

(56) References Cited

U.S. PATENT DOCUMENTS

| | | | |
|---|---|---|---|
| 6,687,588 B2 | 2/2004 | Demerly et al. | |
| 6,929,086 B1 * | 8/2005 | Husain | B62D 5/003 180/402 |
| 9,221,490 B2 | 12/2015 | Shibuya et al. | |
| 9,359,008 B2 | 6/2016 | Takeda | |
| 9,365,237 B2 | 6/2016 | Takeda | |
| 9,376,140 B2 | 6/2016 | Chai et al. | |
| 9,399,486 B2 | 7/2016 | Takeda | |
| 9,415,803 B2 | 8/2016 | Takeda | |
| 9,446,792 B2 | 9/2016 | Takeda | |
| 9,449,235 B2 | 9/2016 | Takeda | |

(Continued)

FOREIGN PATENT DOCUMENTS

| | | |
|---|---|---|
| DE | 19720602 A1 | 1/1998 |
| EP | 1568577 A2 | 8/2005 |

(Continued)

*Primary Examiner* — Aaron L Troost
(74) *Attorney, Agent, or Firm* — Young Basile Hanlon & MacFarlane, P.C.

(57) ABSTRACT

A method for controlling a vehicle includes operating a steering system in manual steer-by-wire control state and determining that a transition to an automated steer-by-wire control state is to be performed by the steering system. The method also includes entering the automated steer-by-wire control state upon determining that all conditions from a group of state entry conditions are satisfied, and operating the steering system in the automated steer-by-wire control state until determining that any condition from a group of state exit conditions is satisfied. The method also includes entering the manual steer-by-wire control state upon determining that any condition from the group of state exit conditions is satisfied.

18 Claims, 9 Drawing Sheets

(56) References Cited

U.S. PATENT DOCUMENTS

| | | |
|---|---|---|
| 9,505,428 B2 | 11/2016 | Chai et al. |
| 9,533,703 B2 | 1/2017 | Shimizu et al. |
| 2006/0200289 A1* | 9/2006 | Chino .................... B62D 5/003 701/41 |
| 2011/0218700 A1 | 9/2011 | Mori et al. |
| 2011/0218706 A1 | 9/2011 | Mori et al. |
| 2012/0303218 A1 | 11/2012 | Tamura et al. |
| 2013/0190986 A1 | 7/2013 | Nishimori |
| 2013/0197757 A1 | 8/2013 | Ellis |
| 2013/0245890 A1 | 9/2013 | Kageyama et al. |
| 2014/0008141 A1 | 1/2014 | Kageyama et al. |
| 2014/0303850 A1 | 10/2014 | Chai et al. |
| 2014/0316658 A1 | 10/2014 | Chai et al. |
| 2015/0025745 A1 | 1/2015 | Tamura et al. |
| 2015/0151778 A1 | 6/2015 | Kageyama |
| 2015/0151786 A1 | 6/2015 | Fujii |
| 2015/0175199 A1 | 6/2015 | Kuramochi |
| 2015/0217801 A1 | 8/2015 | Takeda |
| 2015/0225014 A1 | 8/2015 | Takeda |
| 2015/0225015 A1 | 8/2015 | Takeda |
| 2015/0232124 A1 | 8/2015 | Takeda |
| 2015/0246686 A1 | 9/2015 | Takeda |
| 2015/0246687 A1 | 9/2015 | Takeda |
| 2015/0291210 A1 | 10/2015 | Kageyama |
| 2015/0336606 A1 | 11/2015 | Shibuya et al. |
| 2015/0353128 A1 | 12/2015 | Shibuya et al. |
| 2015/0360715 A1 | 12/2015 | Shimizu et al. |
| 2015/0375780 A1 | 12/2015 | Chai et al. |
| 2016/0114832 A1 | 4/2016 | Taniguchi |
| 2016/0229447 A1 | 8/2016 | Wada et al. |
| 2016/0362102 A1 | 12/2016 | Honda et al. |
| 2016/0368496 A1 | 12/2016 | Honda et al. |
| 2018/0154932 A1* | 6/2018 | Rakouth ............... B62D 15/025 |
| 2018/0154936 A1* | 6/2018 | Yamasaki ................ B62D 6/08 |
| 2019/0241213 A1* | 8/2019 | Szepessy ............... B62D 5/006 |

FOREIGN PATENT DOCUMENTS

| | | | |
|---|---|---|---|
| JP | H07271289 A | | 10/1995 |
| JP | 09240502 A | * | 9/1997 |
| JP | 2002200985 A | * | 7/2002 |

\* cited by examiner

STEER-BY-WIRE SYSTEM WITH MULTIPLE STEERING ACTUATORS

CROSS-REFERENCE TO RELATED APPLICATIONS

This application claims the benefit of U.S. Provisional Application No. 62/484,152, filed on Apr. 11, 2017, entitled "Steer-By-Wire System with Multiple Steering Actuators," the content of which is incorporated herein by reference in its entirety for all purposes.

TECHNICAL FIELD

The application relates generally to vehicle steering systems.

BACKGROUND

Vehicle actuators are controllable systems that cause or affect motion of a vehicle. Examples of vehicle actuators are propulsion actuators, braking actuators, steering actuators, and suspension actuators.

Steer-by-wire systems can eliminate or disconnect a physical connection between a steering wheel (also referred to as a hand wheel) and the road wheels (also referred to as steered wheels).

Some vehicles can be operated in an automated control mode, in which some or all of the tasks of driving are performed by an automated control system, and a manual control mode, in which all of the tasks of driving are performed by a human operator. In addition to these modes, some vehicles can also be operated in a remote control mode, in which some or all of the tasks of driving are controlled by an automated control system or a human driver that is not located in the vehicle.

In vehicles that incorporate automated control modes, the steer-by-wire system can be operated in multiple control modes. One control mode is a manual steer-by-wire mode in which the human operator steers the vehicle using the steering wheel without a physical connection from the steering wheel to the road wheels. Another control mode is an automated steer-by-wire mode in which the steering actuators are controlled by commands from an automated control system or a remote control system without a physical connection from the steering wheel to the road wheels. Another control mode is a fully manual mode in which the human operator steers the vehicle using a physical connection that is established between the steering wheel and the roads wheels. During operation of such a vehicle, transitions between the one or more automated control modes and the manual control mode may occur.

SUMMARY

One aspect of the disclosed embodiments is a method for controlling a vehicle. The method includes operating a steering system in manual steer-by-wire control state, determining that a transition to an automated steer-by-wire control state is to be performed by the steering system, entering the automated steer-by-wire control state upon determining that all conditions from a group of state entry conditions are satisfied, operating the steering system in the automated steer-by-wire control state until determining that any condition from a group of state exit conditions is satisfied, and entering the manual steer-by-wire control state upon determining that any condition from the group of state exit conditions is satisfied.

Another aspect of the disclosed embodiments is a method for controlling a vehicle. The method includes operating a steering system in manual steer-by-wire control state, determining that a transition to an automated steer-by-wire control state is to be performed by the steering system, obtaining manual steering angles and automated steering angles, determining blended steering angles using a blending function during the transition to the automated steer-by-wire control state, and controlling steering actuators using the blended steering angles during the transition to the automated steer-by-wire control state.

Another aspect of the disclosed embodiments is a method for controlling a vehicle. The method includes receiving a steering wheel angle value that represents a manual steering input at a steering wheel and a steering wheel torque that represents manually-applied steering torque at the steering wheel, and receiving steering actuator information describing operating conditions for steering actuators. The method also includes determining component torques for each of the steering actuators using one or more feedback models based on the steering actuator information and the steering wheel angle value, determining a feedback torque based on the component torques and the steering wheel torque, and applying the feedback torque to the steering wheel using a feedback actuator.

Apparatuses and systems are also described herein.

DETAILED DESCRIPTION

The disclosure herein relates to steer-by-wire systems utilized in vehicles that have two or more independent steering actuators. The systems disclosed herein are particularly applicable to systems having four-wheel independent steering including a separate steering actuator for each steered wheel.

The systems and methods described herein include control of feedback supplied to the operator of the vehicle based on operating states at each of the four wheels of the vehicle. As an example, a feedback torque may be determined based on component torques for each of one or more operating conditions at each of the steered wheels.

The systems and methods described herein also regulate initiation and performance of state changes of a vehicle steering system that is operable in multiple control modes including manual control modes and automated control modes. The state changes can be initiated by a human operator or by an automated control system. Dependent upon operating states of the vehicle, a particular control mode transition may or may not be appropriate at a particular moment in time.

Figure 1:
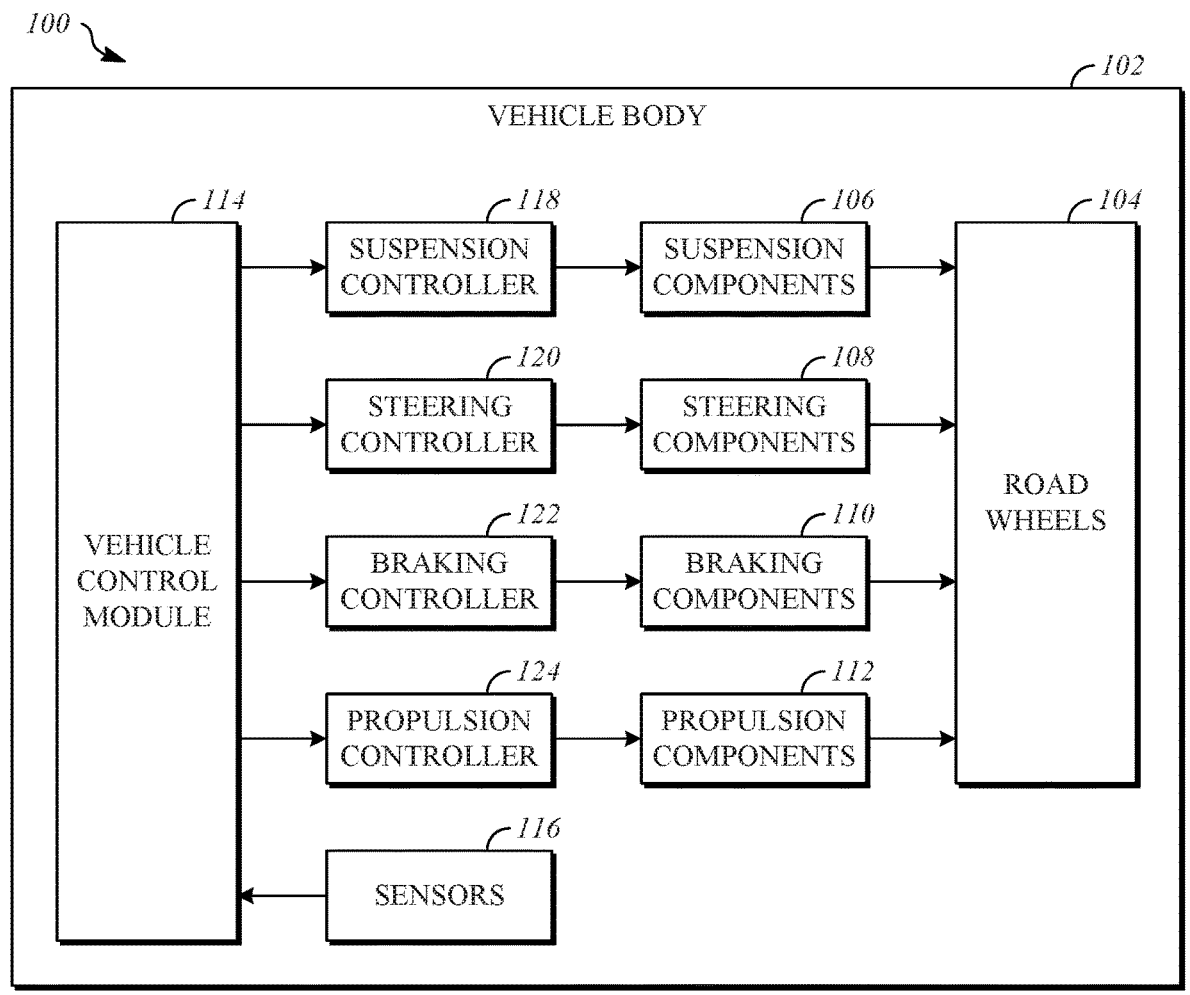
FIG. 1 is a block diagram showing a vehicle.

FIG. 1 shows a vehicle 100 that has a vehicle body 102. The vehicle body 102 may include internal structural portions and external portions that are aesthetic and/or structural in nature. As examples, the vehicle body 102 may include one or more of a unibody, a frame, a subframe, a monocoque, and body panels.

The vehicle 100 includes road wheels 104. As an example, the vehicle 100 can include four of the road wheels 104, but other implementations are possible. The road wheels 104 are the portion of the vehicle 100 that contacts the surface on which the vehicle 100 is travelling, and the characteristics of the road wheels 104 are responsible, in part, for the amount of friction available. The road wheels 104 may include tires, such as conventional pneumatic tires formed in part from synthetic rubber, or other friction-enhancing structures may be incorporated in the road wheels 104.

The vehicle 100 includes suspension components 106. The suspension components 106 typically include numerous individual components, many of which are associated with one or more of the road wheels 104. The suspension components 106 may include components that are operable to control characteristics of the motion of the road wheels 104 relative to the vehicle body 102, such as shocks, struts, springs, and sway bars. The suspension components 106 may include either or both of non-adjustable passive components or adjustable active components that allow modification of suspension characteristics during operation of the vehicle 100. The suspension components 106 may include sensors that output signals indicative of the states and operating characteristics of some or all of the suspension components 106 at a given time. The suspension components 106 may also include actuators that are able to cause modification of characteristics of the suspension components 106 in response to control signals. In implementations where the suspension components 106 include active features controlled by actuators, the suspension characteristics can be controlled independently at each of the road wheels 104.

The vehicle 100 includes steering components 108. The steering components 108 are operable to modify a steering angle of some or all of the road wheels 104 relative to the vehicle body 102. The steering components 108 can be configured to control the steering angles of the road wheels 104 independently, for example, using separate actuators associated with each of the road wheels 104. The steering components 108 include one or more sensors to output signals used to control steering of the vehicle 100, including sensors that measure steering inputs or sensors that measure the actual steering angles of the road wheels 104. Desired steering angles for the road wheels 104 can be determined based inputs made by a human operator using an input device such as a steering wheel, or the desired steering angles of the road wheels 104 can be determined based on decisions made by an automated control system. The desired steering angles can include individual steering angles for each of road wheels 104, such as a front left steering angle $\delta_{FL}$, a front right steering angle $\delta_{FR}$, a rear left steering angle $\delta_{RL}$, and a rear right steering angle $\delta_{RR}$.

The vehicle 100 includes braking components 110. The braking components 110 include components that are operable to slow the speeds of the road wheels 104, such as conventional disk brakes. Other types of components may be utilized to slow the speeds of the road wheels 104. The braking components 110 also include components that cause and control application of braking forces. These components may include, as examples, a brake control module, a master cylinder, and a brake booster. The braking components 110 are operable to apply braking to each of the road wheels 104 individually. The braking components 110 include sensors that output signals that are indicative of the current operating characteristics of the braking components 110. The braking components 110 may also include actuators that are operable to cause and control application of braking forces in response to control signals.

The vehicle 100 includes propulsion components 112, which may also be referred to as a powertrain. The propulsion components 112 include a prime mover that is operable to convert stored energy into driving force, and components that are operable to supply this force to some or all of the road wheels 104 in order to propel the vehicle 100. As one example, the propulsion components 112 may include an internal combustion engine that burns liquid fuel. As another example, the propulsion components 112 may include an electric motor that utilizes electrical energy that is stored in batteries or supplied by a generator, or the propulsion components 112 may include multiple electric motors that are each connected to one of the road wheels 104. In implementations where the propulsion components 112 include multiple electric motors that are each connected to one of the road wheels 104, each electric motor is directly connected to a respective one of the road wheels 104 in a manner that allows torque to be applied directly to each of the road wheels 104 independent of torque applied at the other wheels.

The vehicle 100 includes a vehicle control module 114. The vehicle control module 114 is an electronic control unit that is operable to direct and coordinate operations of multiple actuator systems. The vehicle control module 114 may include a memory and a processor that is operable to execute instructions that are stored in the memory in order to perform operations as will be described herein. Although the vehicle control module 114 is shown as a single device, the same functions may be implemented using multiple devices, such as individual electronic control units that each perform a subset of the functions described herein with respect to the vehicle control module 114.

The vehicle control module 114 makes decisions regarding operation of the vehicle 100 based in part on information that is received from sensors 116 that are in communication with the vehicle control module 114. The sensors 116 monitor and report information regarding operating characteristics of the vehicle 100. Some of the sensors 116 may be incorporated in the suspension components 106, the steering components 108, the braking components 110, and the propulsion components 112.

The vehicle control module 114 can incorporate automated control functions that direct operation of the actuator systems when the vehicle 100 is being operated in an automated control mode. In order to control the individual actuator systems, the vehicle 100 can include a suspension system controller 118, a steering system controller 120, a braking system controller 122, and a propulsion system controller 124. Each of the suspension system controller 118, the steering system controller 120, the braking system controller 122, and the propulsion system controller 124 are electrically connected to the vehicle control module, such as by a data transmission network. One example of a data transmission network that can be incorporated in the vehicle 100 is one that complies with the Controller Area Network standard, which allows connected devices to communicate with other connected devices using a message-based communications protocol.

The suspension system controller 118 is operable to control operation of the suspension components 106. The suspension system controller 118 may include a memory and a processor that is operable to execute instructions that are stored in the memory in order to perform suspension control operations. The suspension system controller 118 may be electrically connected to the suspension components 106 for transmission of signals and/or data, such as commands that change operating characteristics of the suspension components 106. The suspension system controller 118 can include electromechanical components that physically actuate the suspension components 106 and/or change operating characteristics of the suspension components 106.

The steering system controller 120 is operable to control operation of the steering components 108. The steering system controller 120 may include a memory and a processor that is operable to execute instructions that are stored in the memory in order to perform steering control operations. The steering system controller 120 may be electrically connected to the steering components 108 for transmission of signals and/or data, such as commands that change operating characteristics of the steering components 108. The steering system controller 120 can include electromechanical components that physically actuate the steering components 108 and/or change operating characteristics of the steering components 108.

The braking system controller 122 is operable to control operation of the braking components 110. The braking system controller 122 may include a memory and a processor that is operable to execute instructions that are stored in the memory in order to perform braking control operations. The braking system controller 122 may be electrically connected to the braking components 110 for transmission of signals and/or data, such as commands that change operating characteristics of the braking components 110. The braking system controller 122 can include electromechanical components that physically actuate the braking components 110 and/or change operating characteristics of the braking components 110.

The braking system controller 122 can receive and utilize multiple types of information for determining how to control the braking components 110. The information used by the braking system controller 122 can include sensor output signals from sensors included in the braking components 110, information received from the vehicle control module 114 and/or other systems of the vehicle 100.

The propulsion system controller 124 is operable to control operation of the propulsion components 112. The propulsion system controller 124 may include a memory and a processor that is operable to execute instructions that are stored in the memory in order to perform propulsion control operations. The propulsion system controller 124 may be electrically connected to the propulsion components 112 for transmission of signals and/or data, such as commands that change operating characteristics of the propulsion components 112. The propulsion system controller 124 can include electromechanical components that physically actuate the propulsion components 112 and/or change operating characteristics of the propulsion components 112.

Figure 2:
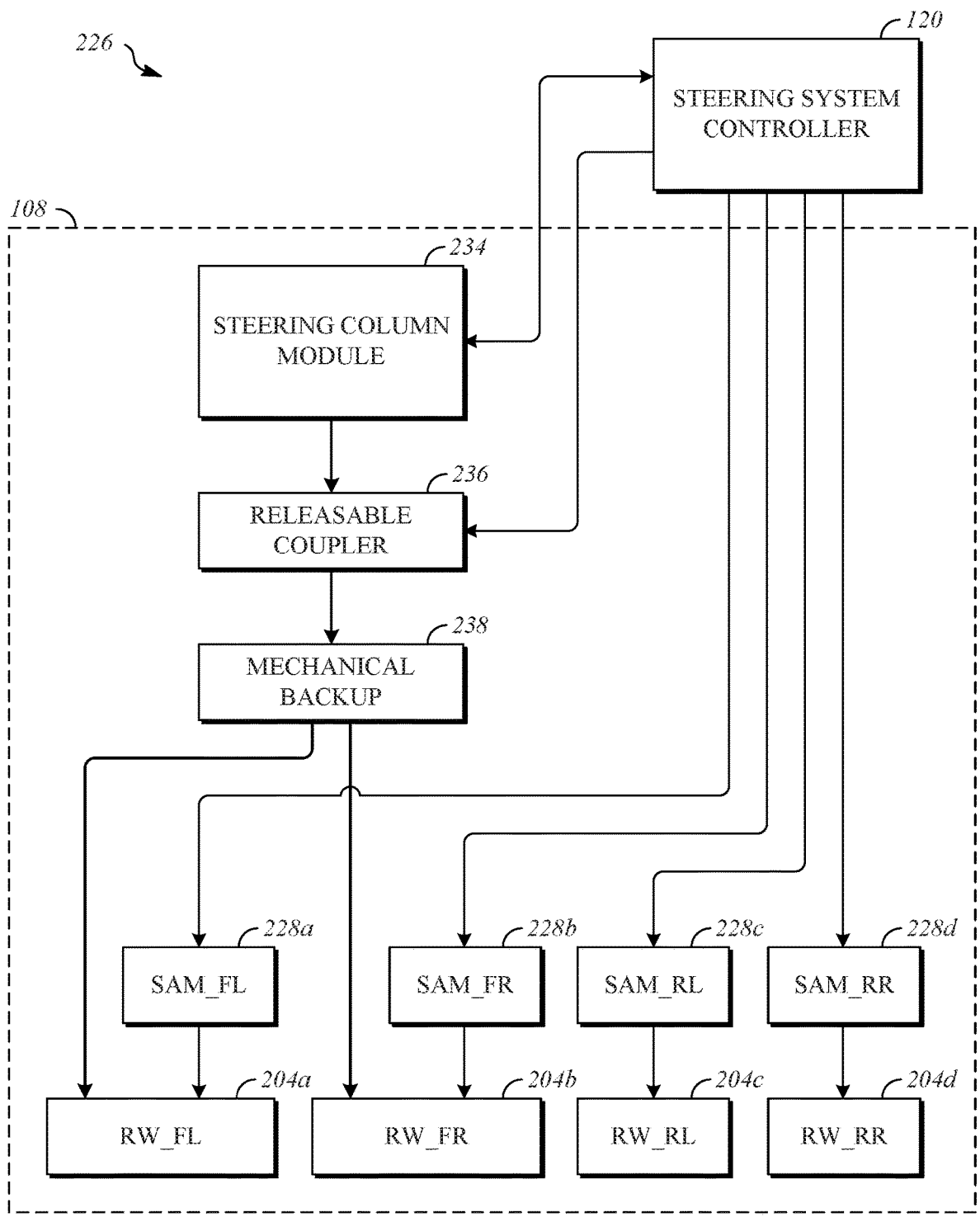
FIG. 2 is an illustration showing a steering system.

FIG. 2 is an illustration showing a steering system 226 that includes the steering system controller 120 and the steering components 108. The steering components 108 include multiple steering actuator modules that each exercise independent control over a separate steered wheel of the vehicle 100. In the illustrated example, the steering components 108 include a front left steering actuator module 228a, a front right steering actuator module 228b, a rear left steering actuator module 228c, and a rear right steering actuator module 228d, which are each electromechanical assemblies that are connected to the steering system controller 120 to allow transmission of signals and data regarding actual and desired steering angles for each steering actuator module.

The front left steering actuator module 228a is connected to a front left road wheel 204a to allow rotation of the front left road wheel 204a by the front left steering actuator module 228a to a desired steering angle in response to commands from the steering system controller 120. The front right steering actuator module 228b is connected to a front right road wheel 204b to allow rotation of the front right road wheel 204b by the front right steering actuator module 228b to a desired steering angle in response to commands from the steering system controller 120. The rear left steering actuator module 228c is connected to a rear left road wheel 204c to allow rotation of the rear left road wheel 204c by the rear left steering actuator module 228c to a desired steering angle in response to commands from the steering system controller 120. The rear right steering actuator module 228d is connected to a rear right road wheel 204d to allow rotation of the rear right road wheel 204d by the rear right steering actuator module 228d to a desired steering angle in response to commands from the steering system controller 120.

The steering actuator modules 228a-228d allow independent control of the steering angles of the road wheels 204a-204d, which allows the steering system controller 120 to determine different steering angles for some or all of the road wheels 204a-204d and output commands to the steering actuator modules 228a-228d that cause rotation of the road wheels 204a-204d in accordance with the determined steering angles.

Figure 3:
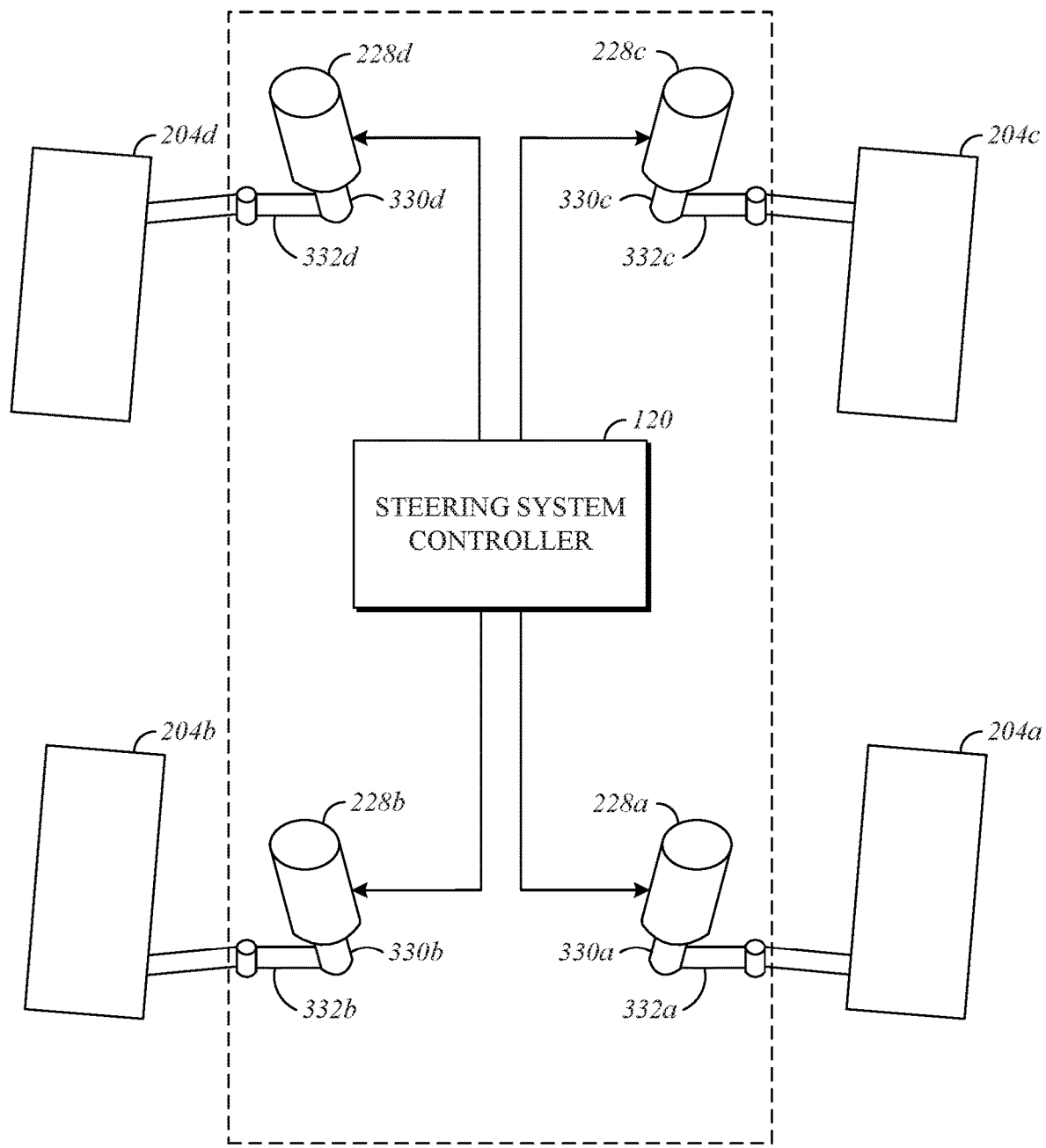
FIG. 3 is an illustration showing an example configuration for steering actuator modules of the steering system.

FIG. 3 is an illustration showing an example configuration of the steering actuator modules of the steering system 226, including the front left steering actuator module 228a, the front right steering actuator module 228b, the rear left steering actuator module 228c, and the rear right steering actuator module 228d. The steering actuator modules 228a-228d are all connected to the vehicle body 102, and can be or include an electric motor having a rotational output part. In the illustrated example, the front left steering actuator module 228a has a front left rotational output part 330a, the front right steering actuator module 228b has a front right rotational output part 330b, the rear left steering actuator module 228c has a rear left rotational output part 330c, and the rear right steering actuator module 228d has a rear right rotational output part 330d. Each rotational output part 330a-330d is positionable to a desired angular orientation and is connectable to a respective steering linkage. In the illustrated example, a front left steering linkage 332a connects the front left rotational output part 330a to the front left road wheel 204a, a front right steering linkage 332b connects the front right rotational output part 330b to the front right road wheel 204b, a rear left steering linkage 332c connects the rear left rotational output part 330c to the rear left road wheel 204c, and a rear right steering linkage 332d connects the rear right rotational output part 330d to the rear right road wheel 204d. Thus, connection of the steering linkages 332a-332d to the road wheels 204a-204d allows the steering actuator modules 228a-228d to turn the road wheels 204a-204d independently and change their respective steering angles.

With further reference to FIG. 2, the steering system 226 includes a steering column module 234, a releasable coupler 236, and a mechanical backup 238. The steering column module 234 is electrically connected to the steering system controller 120 for transmission of signals and data. The steering column module 234 determines a desired steering angle based on user steering input, and transmits the desired steering angle to the steering system controller 120 in the form of signals and/or data. The steering system controller 120 transmits commands to the steering column module 234, such as force feedback commands, as will be described herein.

Figure 4:
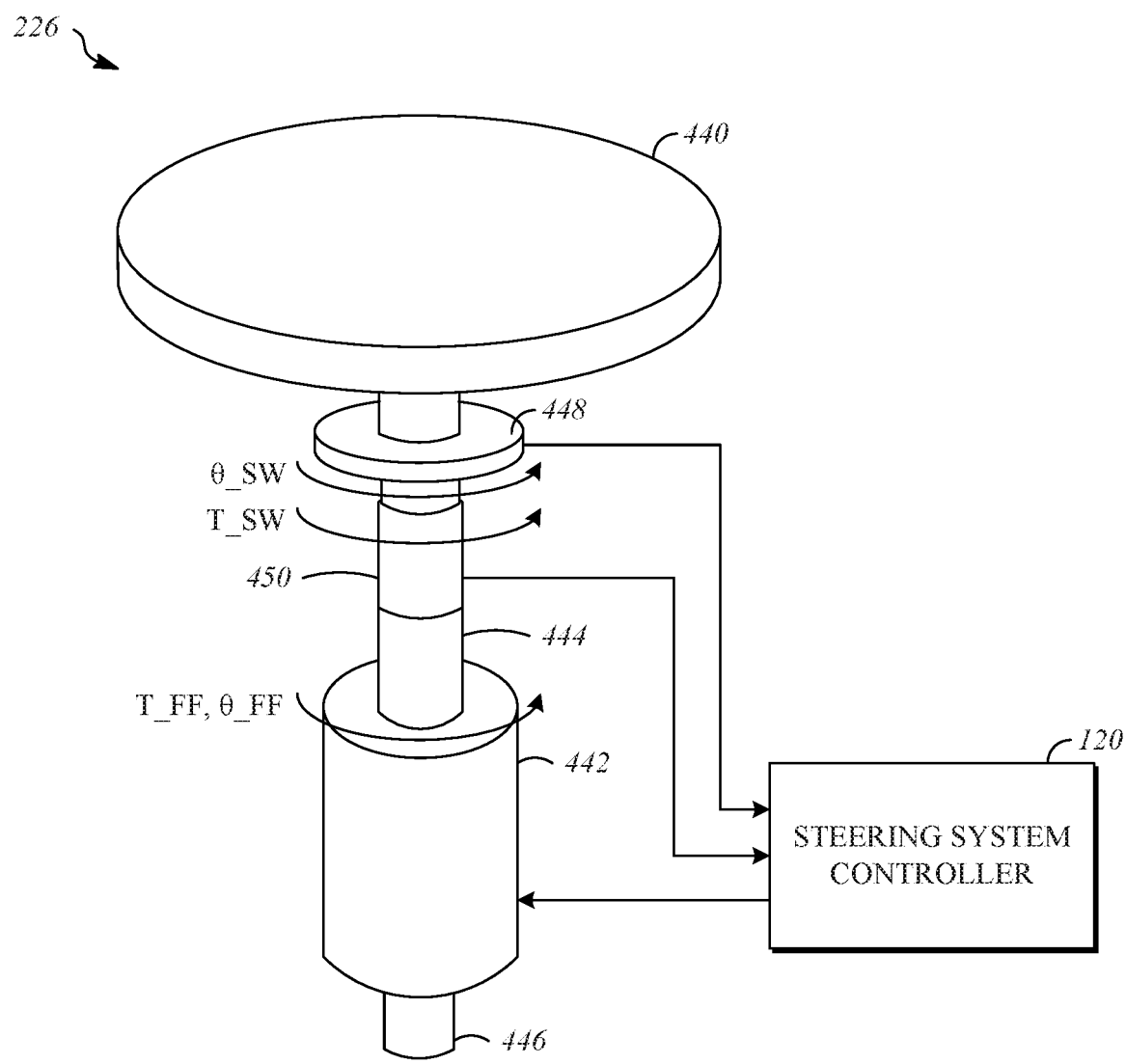
FIG. 4 is an illustration showing an example configuration for a steering column module of the steering system.

FIG. 4 is an illustration showing an example configuration for the steering column module 234 of the steering system 226. The steering column module 234 includes a steering wheel 440, which may also be referred to as the hand wheel of the vehicle 100. The steering column module 234 also includes a feedback actuator such as a force feedback motor 442. The steering wheel 440 is connected to the force feedback motor 442 by a steering column 444. The steering column module 234 is connected to the releasable coupler 236 (FIG. 2) by an extension shaft 446.

The steering wheel 440 is the physical device that the human operator of the vehicle 100 manipulates to control steering of the vehicle 100 when in a manual or semi-automated control mode. The steering wheel 440 could be replaced by other physical devices that allow steering control, such as a control stick or pedals.

The force feedback motor 442 applies a force feedback torque (T_FF) and a force feedback angle (θ_FF) to the steering column 444. The force feedback motor 442 operates in accordance with commands, which can be in the form of signals and/or data, that are received from the steering system controller 120. The force feedback motor 442 can be an electric motor that incorporates a position encoder to allow fine control over operation of the force feedback motor 442 by the steering system controller 120. By causing rotation of the steering wheel 440, the force feedback motor 442 can provide information regarding operation of the vehicle 100 to the human operator of the vehicle 100 in the form of haptic feedback, or can provide information to non-operator occupants in the form of visual feedback if the vehicle 100 is operating in a fully automated control mode.

The steering column module 234 includes a steering angle sensor 448. The steering angle sensor 448 can be any type of sensing device, such as a magnetic or optical encoder, that is able to output a signal to the steering system controller 120 that represents a current angular orientation or a change in angular orientation of the steering wheel 440. The signal output by the steering angle sensor 448 either represents or can be interpreted to determine a steering wheel angle (θ_SW).

The steering column module 234 includes a steering torque sensor 450. The steering torque sensor 450 measures torque applied to the steering wheel 440. One example of a sensor that can be used as the steering torque sensor 450 is a torsion bar torque sensor. Another example of a sensor that can be used as the steering torque sensor 450 is a magnetoelastic torque sensor. The steering torque sensor 450 is operable to output a signal to the steering system controller 120 that represents a steering wheel torque (T_SW).

With further reference to FIG. 2, the releasable coupler 236 is a mechanical device that is actuated by commands from the steering system controller 120. The releasable coupler 236 is able to engage and release a mechanical connection between the steering column module 234 and the mechanical backup 238 to allow operation in a direct manual steering mode as opposed to a steer-by-wire steering mode. The releasable coupler 236 and the mechanical backup 238 are optional, and can be omitted if the vehicle 100 does not use a direct manual steering mode, but instead uses only steer-by-wire steering modes.

The releasable coupler 236 may be any mechanical device that is able to engage and disengage transfer of motion between two components, such as motion between two rotating components. As one example, the releasable coupler 236 can include a clutch that moves between a disengaged position in which steering inputs are not transferred from the steering column module 234 to the mechanical backup 238, and an engaged position in which steering inputs are transferred from the steering column module 234 to the mechanical backup 238 through the releasable coupler 236.

The mechanical backup 238 is a mechanical steering device that is coupled to at least some of the road wheels, such as the front left road wheel 204a and the front right road wheel 204b. The mechanical backup 238 can be, for example, a conventional steering rack. The mechanical backup 238 is operable to control steering of the vehicle 100 when the releasable coupler 236 is engaged, and does not control steering of the vehicle 100 when the releasable coupler 236 is disengaged. The mechanical backup 238 includes components that connect to some or all of the steering linkages 332a-332d (FIG. 3) so that the road wheels 204a-204d can be steered either manually through the mechanical backup 238 or by the steering actuator modules 228a-228d. These components can include a belt drive connection, a spur or helical gear connection, a planetary gear set, and/or a ball screw mechanism.

The steering system controller 120 can receive information from the vehicle control module 114 that describes a vehicle target state for the vehicle 100. The vehicle target states can include, as examples, states that correspond to the vehicle 100 being turned off, operation of the vehicle 100 under manual control, and/or operation of the vehicle 100 under automated control using a local automated control system or a remote automated control system that receives commands from a remote operator.

The steering system controller 120 sets a steering system state based on the vehicle target state, and can send information to the steering components 108 describing the steering system state. The steering system states can be described by variables, such as a bit flag having a value of one or zero. As an example, a steering system state variable having a value of zero indicates that the state is not active, while a value of one indicates that the state is active.

Figure 5:
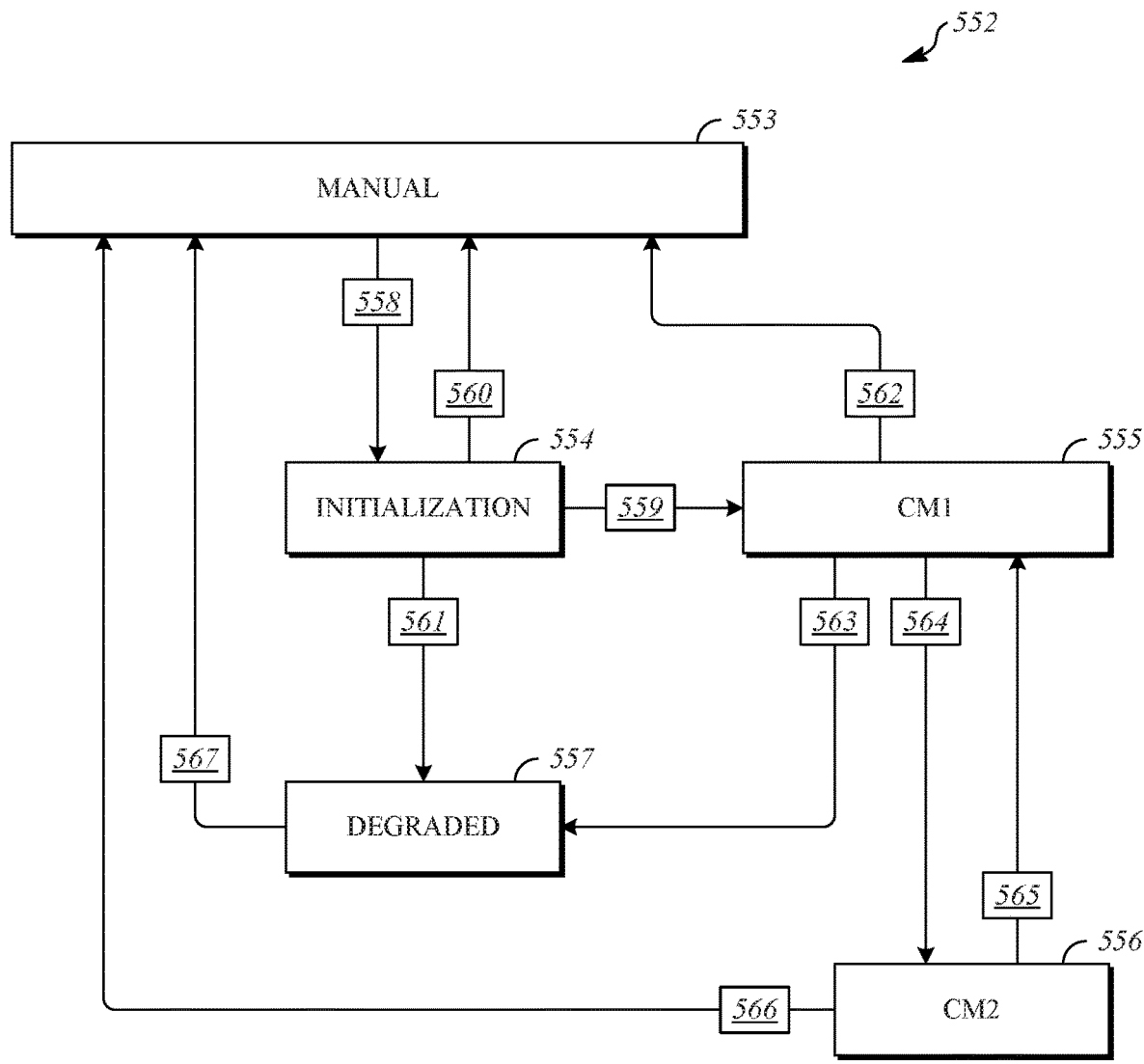
FIG. 5 is an illustration showing a state transition diagram for the steering system.

FIG. 5 is an illustration showing a state transition diagram 552 for the steering system 226 including steering system states and transitions between steering system states.

The steering system states include a manual state 553 (SBW_STATE==MANUAL) in which the road wheels 204a-204d are steered mechanically by the human operator. In the manual state, the releasable coupler 236 is in the engaged position and steering inputs are transferred from the steering column module 234 to the mechanical backup 238 through the releasable coupler 236.

The steering system states include an initialization state 554 (SBW_STATE==INIT) in which the steering system 226 performs initialization tasks. The initialization tasks can include verifying that communications are functioning properly between all components of the steering system 226 and verifying that all components are available and ready for use.

The steering system states include states for steer-by-wire control modes. The steering system states include a manual steer-by-wire state 555 (SBW_STATE==CM1) that corresponds to a manual steer-by-wire control mode. The manual steer-by-wire control mode may also be referred to as a first control mode. In the manual steer-by-wire state 555, the steering system controller 120 controls operation of the steering actuator modules 228a-228d based on inputs made by the human operator using the steering column module 234. Manual driving means that the driver's steering torque is used to determine the front left steering angle $\delta_{FL}$, the front right steering angle $\delta_{FR}$, the rear left steering angle $\delta_{RL}$, and the rear right steering angle $\delta_{RR}$.

The steering system states also include an automated steer-by-wire state 556 (SBW_STATE==CM2) that corresponds to an automated steer-by-wire control mode. The automated steer-by-wire control mode may also be referred to as a second control mode. In the automated steer-by-wire state 556, the steering system controller 120 controls operation of the steering actuator modules 228a-228d based external commands that do not originate from a human operator that is located in the vehicle. As an example, the external commands may be determined by the vehicle control module 114 and transmitted to the steering system controller 120. The external commands are used by the steering system controller 120 to determine the front left steering angle $\delta_{FL}$, the front right steering angle $\delta_{FR}$, the rear left steering angle $\delta_{RL}$, and the rear right steering angle $\delta_{RR}$.

The steering system states also include a degraded manual steer-by-wire state 557 (SBW_STATE==DEGRADED). The degraded manual steer-by-wire state 557 is utilized when one or more faults prevent normal operation of all components of the steering system 226, but steer-by-wire control remains possible.

Transition between steering system states is regulated by state transition variables. For each permissible state transition, a set of state transition variables is defined. The state transition variables can include a variable that indicates a desired state for the steering system 226. The state transition variables can also include one or more state transition variables that specify conditions that must be satisfied for the state transition to occur. State transition variables can be expressed as bit flag values that indicate whether a condition is true or identify a current state as one of two possible states. State transition variables can also be values that express a measurement or other information, such as a speed, an angle, or a torque.

Operation of the steering system 226 defaults to the manual state 553. From the manual state 553, the steering system 226 can perform a state transition 558 to the initialization state 554. The state transition 558 to the initialization state 554 is performed when power is supplied to electronic components of the steering system 226, including the steering system controller 120, the steering actuator modules 228a-228d, and the steering column module 234.

In the initialization state 554, the steering system controller 120 performs initialization tasks. If the initialization tasks complete successfully, the steering system controller 120 indicates a completed condition for the initialization tasks (SBW_STATUS==INIT_COMPLETE) and the steering system controller 120 performs a state transition 559 to the manual steer-by-wire state 555.

If the initialization tasks do not complete successfully, the steering system controller 120 indicates a failed condition for the initialization tasks (SBW_STATUS==INIT_FAILED). When the initialization state 554 results in the failed condition for the initialization tasks, a state transition can be selected based on additional determinations made during initialization.

The initialization tasks include determining whether the steering actuator modules 228a-228d are ready for operation, and the result of this determination indicates a ready condition for the steering actuator modules 228a-228d (SAM_Status==READY) or a failed condition for the steering actuator modules 228a-228d (SAM_Status==FAILED). Determination of the status for the steering actuator modules 228a-228d can include requesting and/or receiving information from each of the steering actuator modules 228a-228d. The ready condition for the steering actuator modules 228a-228d indicates that each is operating normally, ready for use, and able to accept commands. The failed condition for the steering actuator modules 228a-228d indicates that the module reporting the failed condition is not ready for use, for example, as a result of a power failure, a communication failure, or a mechanical failure. The failed condition for the steering actuator modules 228a-228d will trigger the failed condition for the initialization tasks. Other failures identified during the initialization tasks can also trigger the failed condition for the initialization tasks.

The steering system 226 can perform a state transition 560 from the initialization state 554 to the manual state 553. The state transition 560 is performed when initialization results in the failed condition for the initialization tasks and the failed condition for the steering actuator modules 228a-228d (SBW_STATUS==INIT_FAILED AND SAM_Status==FAILED). The state transition 560 is also performed if power is no longer suppled to the steering system 226.

The steering system 226 can perform a state transition 561 from the initialization state 554 to the manual degraded steer-by-wire state 557. The state transition 561 is performed when initialization results in the failed condition for the initialization tasks and the ready condition for the steering actuator modules 228a-228d (SBW_STATUS==INIT_FAILED AND SAM_Status==READY).

In the manual steer-by-wire state 555, the steering system controller 120 can perform a state transition 562 from the manual steer-by-wire state 555 to the manual state 553. The state transition 562 is performed when it is determined, while the steering system controller 120 is in the manual steer-by-wire state 555, that the failed condition for the steering actuator modules 228a-228d has been detected (SAM_Status==FAILED). The state transition 562 is also performed if power is no longer suppled to the steering system 226.

In the manual steer-by-wire state 555, the steering system controller 120 can perform a state transition 563 from the manual steer-by-wire state 555 to the manual degraded steer-by-wire state 557. The state transition 563 is requires the steering actuator modules 228a-228d to be in the ready condition for the (SAM_Status==READY), and is performed when the manual steer-by-wire control mode has experienced a failure (SBW_Status==CM1_CTR_FAILED==1) or when the manual steer-by-wire control mode has experienced a been disabled (SBW_Status==CM1_CTR_DISABLED==1), such as by an external command.

In the manual steer-by-wire state 555, the steering system controller 120 can perform a state transition 564 from the manual steer-by-wire state 555 to the automated steer-bywire state 556. The state transition 564 is performed in response to a request, which can be received at the steering system controller 120 from an external source, such as from the vehicle control module 114. Prior to performing the state transition 564, the steering system controller 120 checks a group of state entry conditions and only performs the state transition 564 if all of the conditions from the group of state entry transition conditions are satisfied. The state entry conditions for the state transition 564 require that the automated steer-by-wire control mode be in a ready condition (CM2_CTR_READY==1), that the steering wheel torque be lower than a threshold amount (T_SW<TORQUE_THRESHOLD), that the steering wheel angle (θ_SW) deviates from a reference position (e.g., a neutral position or a position set by the steering system controller 120 using the force feedback motor 442) by less than a threshold amount (SBW_SteeringAngleDev<ANGLE_THRESHOLD), that the human operator has not depressed the brake pedal (Brake==NOT_PRESSED), that the ready condition for the steering actuator modules 228a-228d has been detected (SAM_Status==READY), and that an emergency manual override function is in the ready state such that it can allow the human operator to assume control of the vehicle if necessary (EMO_STATUS==READY).

In the automated steer-by-wire state 556, the steering system controller 120 can perform a state transition 565 from the automated steer-by-wire state 556 to the manual steer-by-wire state 555. The state transition 565 can be performed in response to a request, which can be received at the steering system controller 120 from an external source, such as from the vehicle control module 114. The state transition 565 can also be performed in response to conditions detected while monitoring state transition variables from a group of state exit conditions while the steering system controller 120 is in the automated steer-by-wire state 556. If any of the state exit conditions are satisfied, the state transition 565 is performed. In particular, the state transition 565 will be performed if the automated steer-by-wire control mode is disabled (CM2_CTR_DISABLED==1), if the automated steer-by-wire control mode has experienced a failure (CM2_CTR_FAILED==1), if the steering wheel torque is greater than or equal to a threshold amount (T_SW>=TORQUE_THRESHOLD), if the steering wheel angle (θ_SW) deviates from the reference position by a threshold amount (SBW_SteeringAngleDev>=ANGLE_THRESHOLD), that the human operator has depressed the brake pedal (Brake==PRESSED), that the failed condition for the steering actuator modules 228a-228d has been detected (SAM_Status==FAILED), or that an emergency manual override function is in the enabled state, which indicates that the human operator is attempting to assume control of the vehicle (EMO_STATUS==ENABLED).

In the automated steer-by-wire state 556, the steering system controller 120 can perform a state transition 566 from the automated steer-by-wire state 556 to the manual state 553. The state transition 566 is performed when the failed condition for the steering actuator modules 228a-228d has been detected (SAM_Status==FAILED). The state transition 566 is also performed if power is no longer supplied to the steering system 226.

In the degraded manual steer-by-wire state 557, the steering system controller 120 can perform a state transition 567 from the degraded manual steer-by-wire state 557 to the manual state 553. The state transition 567 is performed when the failed condition for the steering actuator modules 228a-228d has been detected (SAM_Status==FAILED). The state transition 567 is also performed if power is no longer supplied to the steering system 226.

Figure 6:
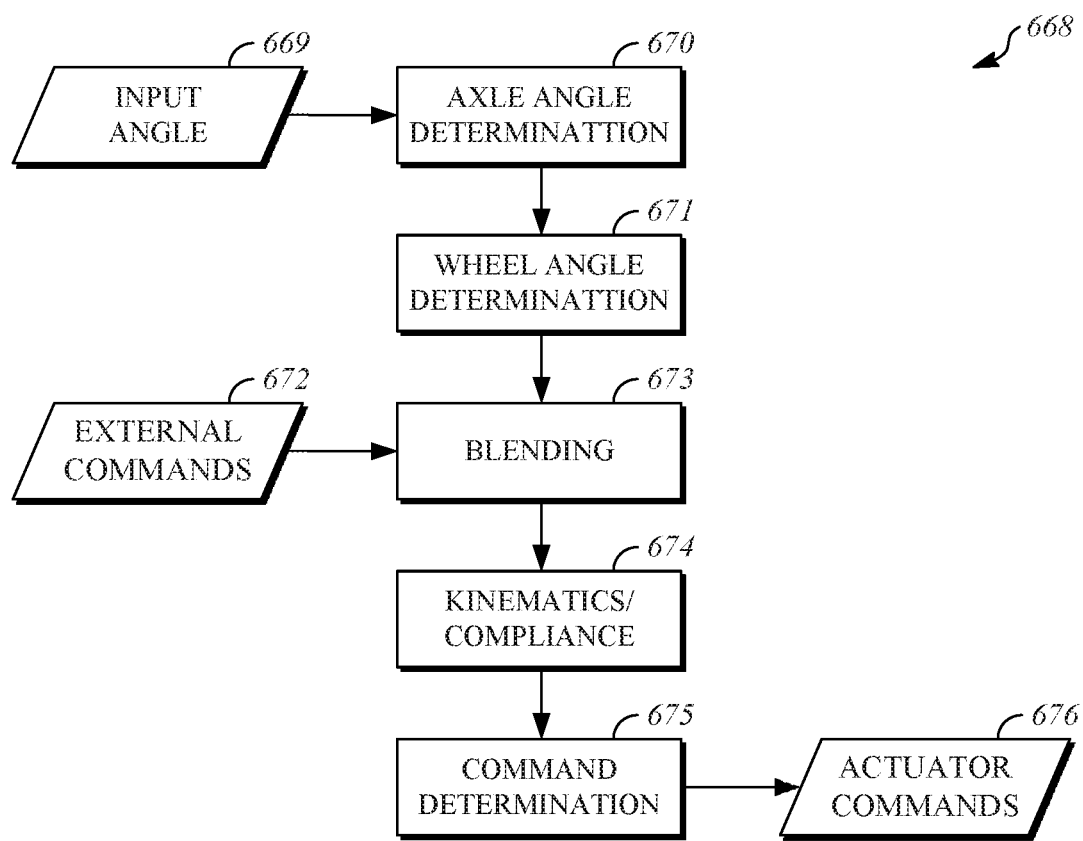
FIG. 6 is a block diagram showing a steering actuator control function.

FIG. 6 is a block diagram showing a steering actuator control function 668 that can be implemented by the steering system controller 120. An input angle 669 representing a steering input from the human operator using the steering wheel 440 or other input device is received at an axle angle determination block 670. The input angle 669 can be, as examples, the steering wheel angle (θ_SW) or the force feedback angle (θ_FF).

The axle angle determination block 670 determines and outputs a front axle road wheel angle and a rear axle road wheel angle. The front axle road wheel angle and the rear axle road wheel angle are each determined in part using a front axle steering ratio and a rear axle steering ratio, respectively, which specify a relationship between the magnitude of the steering angles at the front and rear of the vehicle 100. The front axle road wheel angle and a rear axle road wheel angle are each determined in part based on vehicle dynamics such as vehicle speed, vehicle acceleration, and slip angle. These vehicle dynamics conditions serve as inputs for multi-variable, nonlinear functions that specify relationships between the magnitudes of steering angles and vehicle dynamics conditions. As an example, these functions can be in the form of a front dynamic ratio map and a rear dynamic ratio map, which allow determination of front and rear dynamic ratios. The front axle road wheel angle and a rear axle road wheel angle are then determined based on the input angle 669, the front axle road wheel angle and the rear axle road wheel angle, respectively, and the front dynamic ratio and the rear dynamic ratio, respectively. This determination can be, for example, a multiplicative product of the inputs.

The front axle road wheel angle and a rear axle road wheel angle serve as inputs at a wheel angle determination block 671. The wheel angle determination block 671 determines a front right wheel angle and a front left steering angle corresponding to the manual steering input based on the front axle road wheel angle. The wheel angle determination block 671 determines a rear right wheel angle and a rear left steering angle corresponding to the manual steering input based on the rear axle road wheel angle. The manual road wheel angles are determined so that the effective steering angle associated of the individual wheel angles, when combined, is equivalent to the per axle road wheel angles. The manual road wheel angles may be determined at the wheel angle determination block 671 using Ackerman geometry.

The manual road wheel angles from the wheel angle determination block 671 and external commands 672 are provided as inputs to a blending block 673. In the manual steer-by-wire state 555, and in the absence of a state transition command, the blending block 673 passes the manual road wheel angles from the wheel angle determination block 671 as outputs without modification. In the automated steer-by-wire state 556, and in the absence of a state transition command, the blending block 673 passes external road wheel angles, which are received as part of the external commands 672, as outputs without modification.

In response to receiving a state transition command among the external commands 672, the blending block 673 determines blended road wheel angles based on the manual road wheel angles from the wheel angle determination block 671 and the external road wheel angles from the external commands 672. The blending block 673 outputs blended road wheel angles by weighting the manual road wheel angles from the wheel angle determination block 671, weighting the external road wheel angles from the external commands 672 and adding the weighted values.

During the state transition 564 from the manual steer-by-wire state 555 to the automated steer-by-wire state 556 the manual road wheel angles are initially weighted at one hundred percent and the external road wheel angles are initially weighted at zero percent. According to a blending function, the weightings change, until the manual road wheel angles are weighted at zero percent and the external road wheel angles are weighted at one hundred percent upon completion of the state transition 564 from the manual steer-by-wire state 555 to the automated steer-by-wire state 556. In some implementations, a sum of a weighting value for the manual road wheel angles and a weighting value for the external road wheel angles is equal to one-hundred percent at all times during the state transition 564 from the manual steer-by-wire state 555 to the automated steer-by-wire state 556.

During the state transition 565 from the automated steer-by-wire state 556 to the manual steer-by-wire state 555 the manual road wheel angles are initially weighted at zero percent and the external road wheel angles are initially weighted at one hundred percent. According to the blending function, the weightings change until the manual road wheel angles are weighted at one hundred percent and the external road wheel angles are weighted at 100 percent upon completion of the state transition 565 from the automated steer-by-wire state 556 to the manual steer-by-wire state 555. In some implementations, a sum of a weighting value for the manual road wheel angles and a weighting value for the external road wheel angles is equal to one-hundred percent at all times during the state transition 565 from the automated steer-by-wire state 556 to the manual steer-by-wire state 555.

The blending function determines the relative weightings for the manual and external commands based on one factor or based on a combination of factors. As one example, the blending function may be time-dependent. As another example, the blending function may be dependent upon torque applied at the steering wheel 440. As another example, the blending function may be dependent upon a difference between the manual road wheel angles and the external road wheel angles.

The road wheel angles output by the blending block 673 serve as inputs to a kinematics and compliance compensation block 674, where the road wheel angles are modified based on the kinematics of the road wheels 204a-204d and based on forces and moments acting on the road wheels 204a-204d.

The road wheel angles output by the kinematics and compliance compensation block 674 serve as inputs to a command determination block 675. The command determination block 675 uses a predefined function to convert the road wheel angles to actuator commands. The predefined function is based on the configurations for each of the steering actuator modules 228a-228d. Actuator commands 676 that are output by the command determination block 675 cause the steering actuator modules 228a-228d to rotate the road wheels 204a-204d in accordance with the desired road wheel angles.

Figure 7:
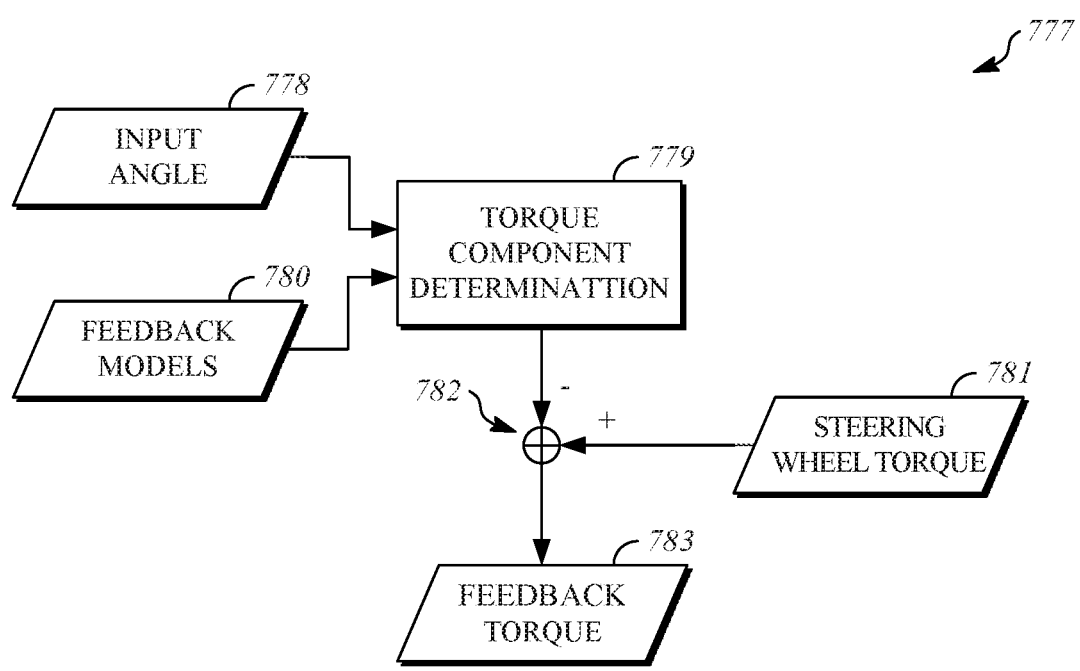
FIG. 7 is a block diagram showing a feedback control function.

FIG. 7 is a block diagram showing a feedback control function 777 that can be implemented by the steering system controller 120. An input angle 778 representing a steering input from the human operator using the steering wheel 440 or other input device is received at a torque component determination block 779. The input angle 778 can be, as examples, the steering wheel angle ($\theta\_SW$) or the force feedback angle ($\theta\_FF$). Multiple feedback models 780 are also received as inputs at the torque component determination block.

Each feedback model is used by the torque component determining block 779 to determine a torque component. The feedback models 780 utilize the input angle 778 in their respective torque component determinations, and also utilize other information that relates to operation of the vehicle 100. This information can include vehicle speed, various vehicle dynamics states and measurements such as lateral acceleration and yaw rate, and forces and torques acting upon the steering actuator modules 228a-228d as a result of contact of the road wheels 204a-204d with, as examples, potholes, curbs, or rough pavement.

The feedback models 780 can include a road feel force model that outputs a road feel torque component based on the input angle 778, vehicle states, and forces and torques acting upon the steering actuator modules 228a-228d. The road feel force model can be based on a three-dimensional look up table as a function of vehicle traveling speed and lateral acceleration that gives a coefficient value for each of the steering actuator modules 228a-228d. The coefficients are applied to the respective measured or estimated torques at each of the steering actuator modules 228a-228d and the resulting values are summed to give the road feel torque component. A filter can be applied to the road feel torque component based on the undamped natural frequency of the system and a damping ratio using, for example, a three dimensional look-up table as a function of vehicle traveling speed and lateral acceleration.

A yaw rate feedback model and a side slip feedback model can each contribute torque components using three-dimensional look up tables as a function of vehicle traveling speed and lateral acceleration. The look up tables are used to define coefficients that are applied to the yaw rate and side-slip angle, respectively, to define a yaw torque component and a side-slip torque component.

The feedback models 780 can include a damping feel model that emulates the sensation of damping. The damping feel model can be implemented, for example, using a look-up table as a function of vehicle speed and lateral acceleration.

The feedback models 780 can include a friction feel model that emulates the sensation of mechanical friction. The friction feel model can be implemented, for example, using a look-up table as a function of vehicle traveling speed and lateral acceleration.

The feedback models 780 can include a hysteresis feel model that emulates the hysteresis that is present in a mechanical system. The hysteresis feel model can be implemented, for example, using a look-up table as a function of vehicle traveling speed and lateral acceleration.

The feedback models 780 can include a self-centering model that emulates the tendency of a mechanical steering system to rotate the steering wheel toward a centered position. The self-centering model can be implemented, for example, using a look-up table as a function of vehicle traveling speed and steering wheel angle.

The torque components determined by the torque component determining block 779 are output and combined with a steering wheel torque value 781 that is representative of the torque applied at the steering wheel 440. For example, the steering wheel torque value 781 can be the steering wheel torque (T_SW). The torque components are applied in opposition to the direction of the steering wheel torque value at summing block 782. The result is output as a feedback torque 783. The feedback torque 783 can be applied directly using the feedback motor 442 as the force feedback torque (T_FF), or the feedback torque 783 can be subsequently adjusted or filtered before being applied by the force feedback motor 442.

In operation, the feedback control function 777 can be implemented by the steering system 226 of the vehicle 100, and includes receiving a steering wheel angle value that represents a manual steering input at a steering wheel, such as the steering wheel 440, and a steering wheel torque that represents manually-applied steering torque at the steering wheel, as well as receiving steering actuator information describing operating conditions for steering actuators, such as the steering actuator modules 228a-228d. Implementation of the feedback control function 777 further includes determining component torques for each of the steering actuators (e.g., the steering actuator modules 228a-228d) using one or more of the feedback models 780 based on the steering actuator information and the steering wheel angle value, determining a feedback torque based on the component torques and the steering wheel torque, and applying the feedback torque to the steering wheel using a feedback actuator, such as the force feedback motor 442.

Figure 8:
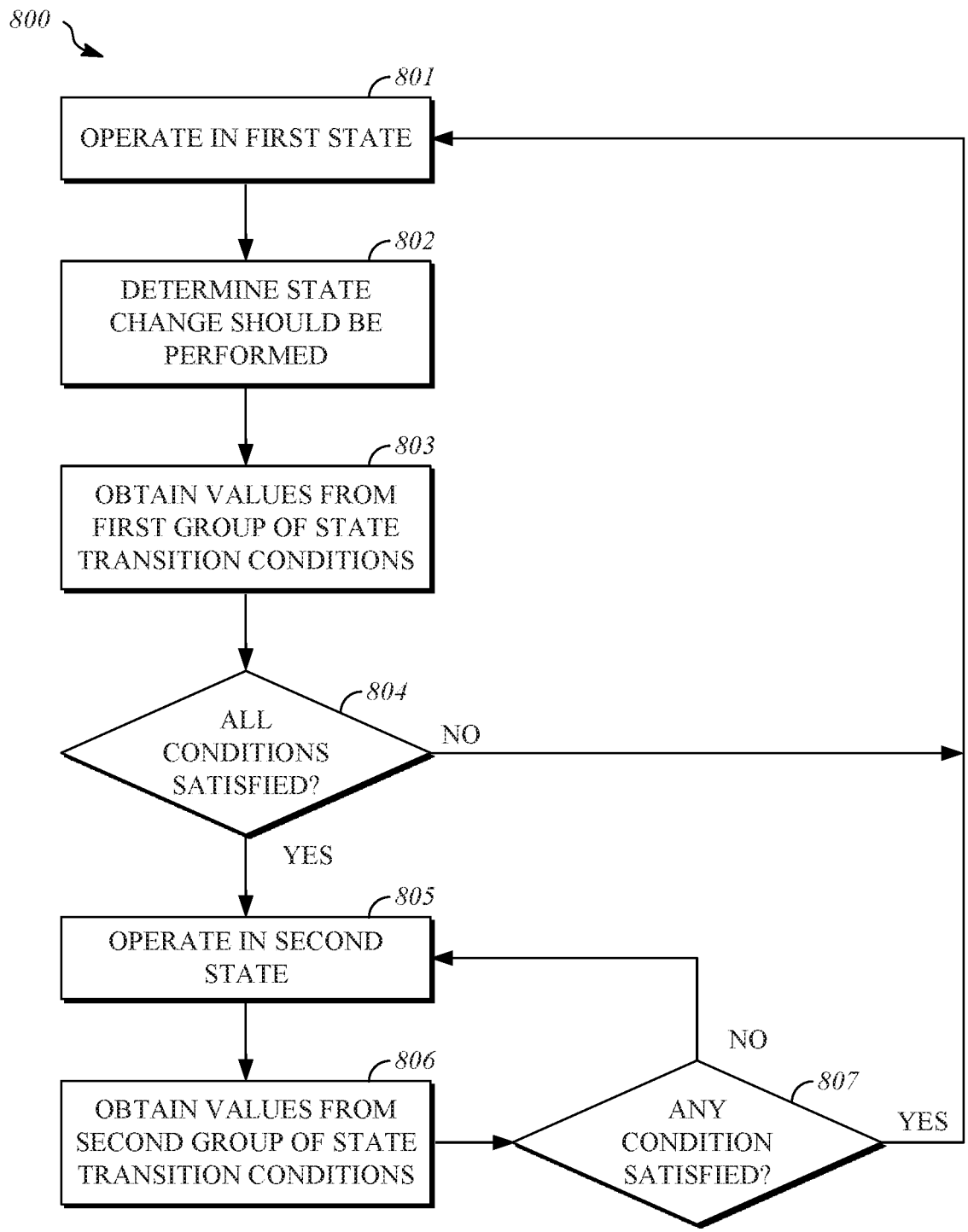
FIG. 8 is a flowchart showing a steering system state transition process according to a first example.

FIG. 8 is a flowchart showing a steering system state transition process 800 according to a first example. The steering system state transition process 800 may be implemented using the steering system 226, and may be implemented in part by software executed by some or all of the components of the vehicle 100, such as the vehicle control module 114 and the steering system controller 120.

In operation 801, the steering system 226 of the vehicle 100 is operated in a first control state. The first control state can be a manual control state in which primary control of the steering system 226 is directed by a human operator, such as the manual steer-by-wire state 555. Manual control can be performed using an input device that controls steering angles applied to the road wheels 204a-204d by the steering system 226. As an example, the input device can be the steering wheel 440. In the first control state, operation of the input device does not cause a state change from the first state to a different state.

In operation 802, the steering system 226 determines that a state change from the first state to a second state should be performed. As one example, the steering system 226 determines that the state change from the first state to the second state should be performed upon receiving a request for a state change from the vehicle control module 114. The second control state can be a non-manual control state in which no human operator within the vehicle 100 has primary responsibility for operation of the vehicle steering. As examples, the second control state can be an automated vehicle control state or a remote control state such as the automated steer-by-wire state 556.

In operation 803, the steering system 226 obtains information describing a first group of state transition conditions that correspond to transition from the first control state to the second control state and values corresponding to each of the state transition conditions. The state transition conditions can be, as examples, variables having values that describe current operating states or characteristics of the vehicle 100 or variables that express a measurement that is related to operation of the vehicle 100 or a system of the vehicle 100.

In operation 804, the steering system 226 determines whether all conditions from the first group of state transition conditions are satisfied. If all conditions from the first group of state transition conditions are satisfied, the process proceeds to operation 805, otherwise, the process returns to operation 801 and the vehicle 100 continues to operate in the first control state.

In operation 805, the steering system 226 operates the vehicle 100 in the second control state. In operation 806, the steering system 226 obtains information describing a second group of state transition conditions that correspond to transition from the second control state to the first control state. At operation 807, the process returns to operation 805 if none of the conditions from the second group of state transition conditions are satisfied, and the process returns to operation 801 by transitioning the vehicle 100 back to the first control state if any of the conditions from the second group of state transition conditions are satisfied.

Figure 9:
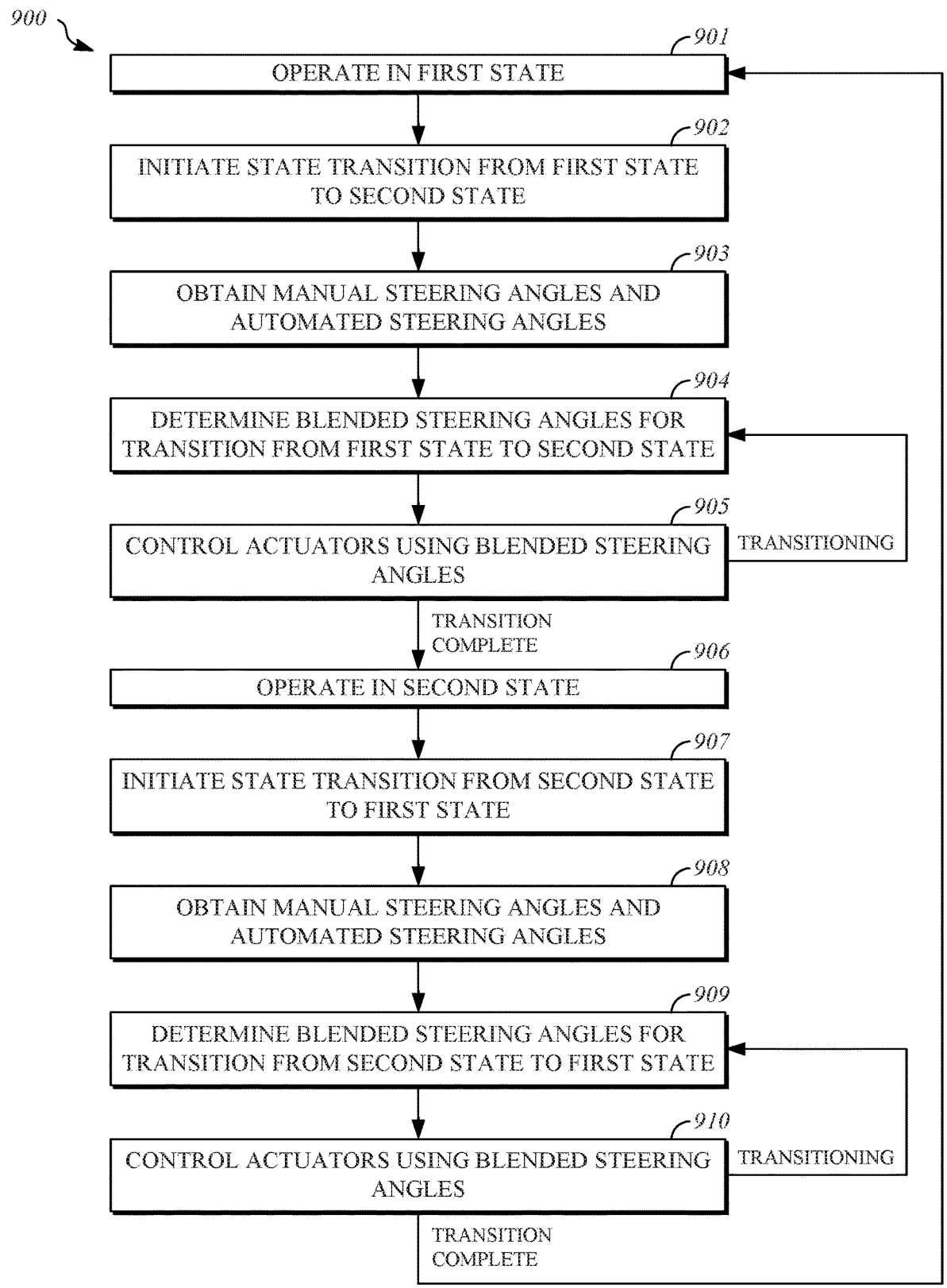
FIG. 9 is a flowchart showing a steering system state transition process according to a second example.

FIG. 9 is a flowchart showing a steering system state transition process 900 according to a second example. The steering system state transition process 800 may be implemented using the steering system 226, and may be implemented in part by software executed by some or all of the components of the vehicle 100, such as the vehicle control module 114 and the steering system controller 120.

In operation 901, the steering system 226 of the vehicle 100 is operated in a first control state. The first control state is a manual control state in which primary control of the steering system 226 is directed by a human operator, such as the manual steer-by-wire state 555. Manual control can be performed using an input device that controls a magnitude of a steering angles applied to the road wheels 204a-204d by the steering system 226. As an example, the input device can be the steering wheel 440. In the first control state, operation of the input device does not cause a state change from the first state to a different state.

In operation 902, the steering system 226 initiates a state transition from the first control state to a second control state. The state transition is initiated when the steering system 226 determines that a state change from the first control state to a second control state should be performed. As one example, the steering system 226 determines that the state change from the first control state to the second control state should be performed upon receiving a request for a state change from the vehicle control module 114. The second control state can be a non-manual control state in which no human operator within the vehicle has primary responsibility for operation of the vehicle steering, such as an automated vehicle control state or a remote control state such as the automated steer-by-wire state 556.

In operation 903, manual steering angles and automated steering angles are obtained. The manual steering angles indicate wheel angles corresponding to operation of an input device, such as the steering wheel 440, by the human operator. The automated steering angles are determined by an automated system that can be external to the steering system 226, such as automated control software executed by the vehicle control module 114 or based on commands from a remote location.

In operation 904 blended steering angles are determined based on the manual steering angles and the automated steering angles using a blending function. The blending function can apply weights to the manual steering angles and the automated steering angles and sum the weighted values. During the state transition, the blended angles change over time, by decreasing the weighting of the manual steering angles and increasing the weighting of the automated steering angles such that, initially, the manual steering angles are weighted at one hundred percent, which decreases to zero percent as the weighting of the automated steering angles increases from zero percent to one hundred percent. This transition can be time dependent, steering input dependent, or dependent on any other information associated with operation of the steering system 226. The state transition can occur during a transition time period, which may be predetermined or dependent upon factors such as vehicle operating characteristics. In some implementations, a sum the weighting applied to the manual steering angles and the weighting applied to the automated steering angles is equal to one-hundred percent at all times during the transition. As an example, operation 904 can be performed in the manner described with respect to the blending block 673 of the steering actuator control function 668.

In operation 905, the steering actuators are controlled using the blended steering angles until the state transition is completed. Then, the process proceeds to operation 906 where the steering system 226 operates the vehicle 100 in the second control state.

In operation 907, the steering system 226 initiates a state transition from the second control state to the first control state. The state transition is initiated when the steering system 226 determines that a state change from the second state to the first state should be performed. In operation 908, manual steering angles and automated steering angles are obtained.

In operation 909 blended steering angles are determined based on the manual steering angles and the automated steering angles using a blending function. The blending function can apply weights to the manual steering angles and the automated steering angles and sum the weighted values. During the state transition, the blended angles change over time, by decreasing the weighting of the automated steering angles and increasing the weighting of the manual steering angles such that, initially, the automated steering angles are weighted at one hundred percent, which decreases to zero percent as the weighting of the manual steering angles increases from zero percent to one hundred percent. This transition can be time dependent, steering input dependent, or dependent on any other information associated with operation of the steering system 226. The state transition can occur during a transition time period, which may be predetermined or dependent upon factors such as vehicle operating characteristics. In some implementations, a sum the weighting applied to the manual steering angles and the weighting applied to the automated steering angles is equal to one-hundred percent at all times during the transition. As an example, operation 909 can be performed in the manner described with respect to the blending block 673 of the steering actuator control function 668.

In operation 910, the steering actuators are controlled using the blended steering angles until the state transition is completed. Then, the process returns to operation 901 where the steering system 226 operates the vehicle 100 in the first control state.

What is claimed is:

1. A method for controlling a vehicle, comprising:
operating a steering system in a manual steer-by-wire control state;
determining that a transition to an automated steer-by-wire control state is to be performed by the steering system;
entering the automated steer-by-wire control state upon determining that all conditions from a group of state entry conditions are satisfied;
operating the steering system in the automated steer-by-wire control state until determining that any condition from a group of state exit conditions is satisfied; and
entering the manual steer-by-wire control state upon determining that any condition from the group of state exit conditions is satisfied,
wherein the group of state entry conditions and the group of state exit conditions include a status condition for one or more steering actuator modules, a steering wheel angle threshold for angle of rotation of a steering wheel about a steering column, a steering wheel torque threshold for manually-applied steering torque at the steering wheel about the steering column, and a status condition for a brake pedal of the vehicle.

2. The method of claim 1, wherein determining that all conditions from the group of state entry conditions are satisfied includes determining that a steering wheel torque value is less than the steering wheel torque threshold.

3. The method of claim 1, wherein determining that all conditions from the group of state entry conditions are satisfied includes determining that a steering wheel angle value deviates from a steering wheel reference position by less than the steering wheel angle threshold.

4. The method of claim 1, wherein determining that all conditions from the group of state entry conditions are satisfied includes receiving information from all of the one or more steering actuator modules and determining, based on the information, that the status condition for all of the one or more steering actuator modules corresponds to a ready condition.

5. The method of claim 1, wherein determining that any condition from the group of state exit conditions is satisfied includes determining that a steering wheel torque value is greater than the steering wheel torque threshold.

6. The method of claim 1, wherein determining that any condition from the group of state exit conditions is satisfied includes determining that a steering wheel angle value deviates from a steering wheel reference position by greater than the steering wheel angle threshold.

7. The method of claim 1, wherein determining that any condition from the group of state exit conditions is satisfied includes receiving information from any of the one or more steering actuator modules and determining, based on the information, that the status condition for any of the one or more steering actuator modules corresponds to a failed condition.

8. The method of claim 1, wherein entering the automated steer-by-wire control state includes transitioning from operation using manual steering angles to operation using automated steering angles during a transition time period.

9. The method of claim 1, wherein entering the manual steer-by-wire control state includes transitioning from operation using automated steering angles to operation using manual steering angles during a transition time period.

10. The method of claim 1, wherein the group of state entry conditions and the group of state exit conditions include conditions associated with readiness of an emergency manual override function.

11. The method of claim 1, wherein determining that all conditions from the group of state entry conditions are satisfied includes determining that the status condition for the brake pedal is a not-pressed condition.

12. The method of claim 1, wherein determining that any condition from the group of state exit conditions is satisfied includes determining that the status condition for the brake pedal is a pressed condition.

13. A method for controlling a vehicle, comprising:
operating a steering system in an automated steer-by-wire control state after determining that all conditions from a group of state entry conditions are satisfied, wherein the group of state entry conditions includes a ready condition for one or more steering actuator modules, a steering wheel angle of rotation about a steering column below a steering wheel angle threshold, a steering wheel torque for manually-applied steering torque at the steering wheel about the steering column below a steering wheel torque threshold, and a not-pressed condition for a brake pedal of the vehicle;

determining that a transition from the automated steer-by-wire control state to a manual steer-by-wire control state is to be performed by the steering system;

entering the manual steer-by-wire control state upon determining that any condition from a first group of state exit conditions is satisfied, wherein the first group of state exit conditions includes a steering wheel angle of rotation about the steering column above the steering wheel angle threshold, a steering wheel torque for manually-applied steering torque at the steering wheel about the steering column above the steering wheel torque threshold, a depressed condition for the brake pedal, a disabled condition or a failed condition for an automated steer-by-wire control mode, and an enabled condition for an emergency manual override function;

operating the steering system in the manual steer-by-wire control state;

determining that a transition from the manual steer-by-wire control state to a manual degraded steer-by-wire control state is to be performed by the steering system;

entering the manual degraded steer-by-wire control state upon determining that all conditions from a second group of state exit conditions is satisfied, wherein the second group of state exit conditions includes a ready condition for one or more steering actuator modules and a disabled condition or a failed condition for a manual steer-by-wire control mode; and operating the steering system in the manual degraded steer-by-wire control state.

14. The method of claim 13, further comprising:

determining that a transition from the manual degraded steer-by-wire control state to a manual state is to be performed by the steering system;

entering the manual state upon determining a failed condition for the one or more steering actuator modules; and operating the steering system in the manual state.

15. The method of claim 13, wherein the disabled condition for the manual steer-by-wire control mode occurs in response to an external command to disable the manual steer-by-wire control mode.

16. The method of claim 13, wherein the enabled condition for the emergency manual override function indicates that a human operator is attempting to assume control of the vehicle.

17. The method of claim 13, wherein entering the manual steer-by-wire control state includes transitioning from operation using automated steering angles to operation using manual steering angles during a transition time period.

18. The method of claim 13, wherein operating in the automated steer-by-wire control state includes transitioning from operation using manual steering angles to operation using automated steering angles during a transition time period.

* * * * *